Jan. 17, 1928.
T. PETERSEN
1,656,599
METHOD OF AND TOOL FOR CUTTING SCREW THREADS
Filed Aug. 25, 1924
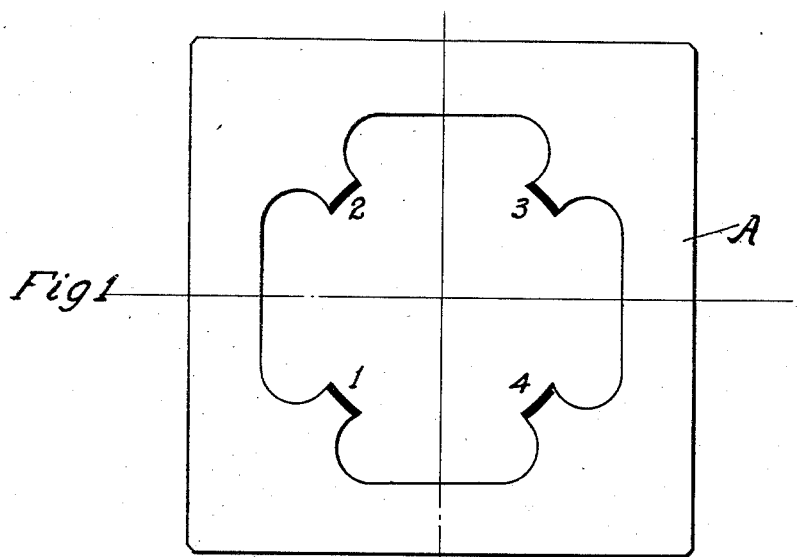
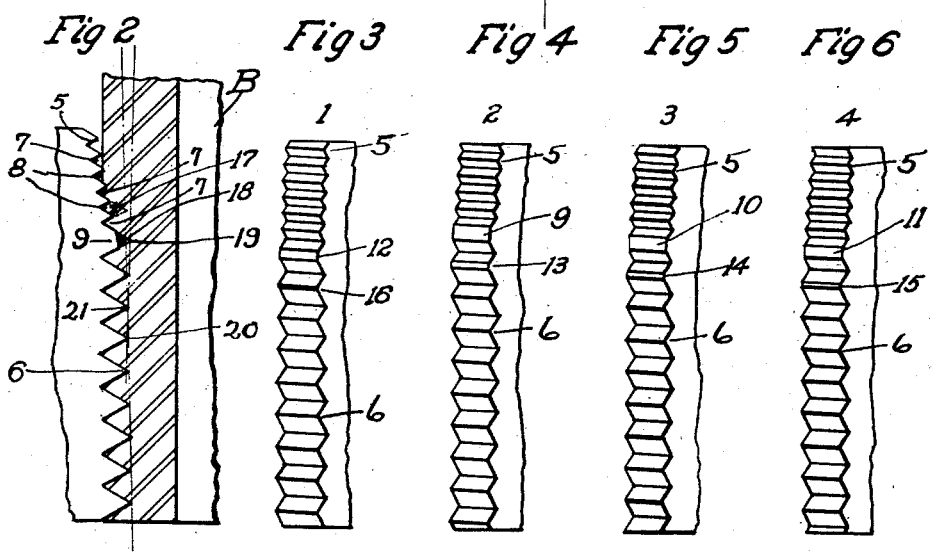
Inventor
Thorvald Petersen
By W. L. Lord
Attorney Patented Jan. 17, 1928.

1,656,599

UNITED STATES PATENT OFFICE.

THORVALD PETERSEN, OF ERIE, PENNSYLVANIA, ASSIGNOR TO REED MANUFACTURING COMPANY, OF ERIE, PENNSYLVANIA, A CORPORATION OF PENNSYLVANIA.

METHOD OF AND TOOL FOR CUTTING SCREW THREADS.

Application filed August 25, 1924. Serial No. 733,947.

Screw threads are ordinarily cut by a succession of screw cutting teeth on dies or taps, each succeeding tooth cutting a portion of the opposing slopes of the thread. The chip from such a cut is V-shaped in cross section and consequently offers quite a resistance to the cutting movement. The chip by reason of its shape is usually broken into very short lengths. With tapered threads, such as pipe threads, each succeeding tooth takes a slight shaving so that this V-shaped chip extends through quite a number of succeeding threads. The difficulty, therefore, is aggravated in cutting tapered threads. It is also difficult to start the cutting tool, particularly dies, and it is common to provide such tools with a lead screw to assure the proper starting of the die.

According to the present invention I form an initial screw thread of approximately the lead of the final crests but do not complete the troughs of these screw threads. On the contrary I do not cut out the troughs of these threads and in effect, therefore, form an intermediate thread so that there is in the starting or throat of the die a double screw thread. Such a thread will readily engage a pipe, or part to be cut and start the tool. One reason for this is that there are a greater number of teeth adapted to engage the pipe and with the taper teeth at exactly the right diameter are more certain to be available for making the initial engagement. While the metal removed in forming these thin threads may be V-shaped in cross section the depth of the trough is so slight that the cross section of the chip does not present the resistance of a cross section of a full-depth chip.

After this initial thin double thread is formed I remove practically in a single cutting at the base the intermediate thread leaving a trough with a substantially flat bottom. Succeeding teeth then remove the metal from the bottom of the trough by succeeding cuts, the ends of this cut being in line with the slope of the final thread. In this way a cut of deep cross section is avoided so that the turning effort in cutting the thread is very much reduced.

In cutting tapered threads such as pipe threads, particularly where the dies are of a thickness to cut the entire pipe thread without the adjustment of the die the succeeding cuts extend over so many threads as to offer very great resistance. I prefer, therefore, in cutting out the intermediate thread to cut it out with slopes which will form a crest approximately in line with the succeeding teeth—in other words, make the crest of this tooth extended inwardly from the line of the taper of the crest of the finished teeth. The effect of this is to relieve the teeth immediately following this in the die from the necessity of cutting the side slopes of the threads adjacent to their crests, thus reducing the number of teeth engaged in cutting the side slopes and thus reducing the effort necessary to turn the die.

I have illustrated the invention as operating in connection with a die as follows:—

Fig. 1 shows an elevation of a die.

Fig. 2 a side elevation of one of the cutting faces of the chasers on the die.

Figs. 3, 4, 5 and 6 numbers 1, 2, 3 and 4 chasers arranged with succeeding teeth in alinement as they engage the work successively.

A marks a die and B a section of pipe being cut.

Initial teeth 5 of the lead of the final thread are formed at the throat of the chasers. These are small teeth and form a double thread and are followed by the full depth cutting teeth 6. The teeth 5 form the initial crests 7, these crests being formed along the same spiral formed by the final crests cut by the teeth 6. Intermediate crests 8 are formed between the crests 7, these crests being in effect intermediate threads formed in the troughs of the threads with the crests 7. When the teeth have made their cuts to practically the depth of these teeth and have thus fully started the die the intermediate thread 8 is completely removed, preferably by a single cut of a tooth 9 as shown in the chaser 2. Following the tooth 9 successive teeth 10, 11, 12, 13, 14, 15 and 16 take small flat cuts as indicated in dotted lines at 17 and 18 in Fig. 2. At the complet of these cuts a V-shaped trough is formed. Following this the teeth 6 finish the thread and where a tapered thread is to be formed the crests of the thread formed by the teeth 6 are on a taper.

It will be observed, therefore, that the main cut of the thread is made by the teeth 5 and by the teeth 9, succeeding teeth taking cuts of shallow cross section. The teeth 6 only make the full V-shaped cuts and these only to a depth necessary to give the thread the desired taper where a tapered thread is cut.

While the tooth 9 removes the entire thread 8, this thread at this point is so shallow that the cross sectional depth of the chip is comparatively slight and there is slight resistance. I prefer to make the slopes of this tooth such as to form a crest at 19 inwardly between the line of the taper formed by the crests 20 of the teeth 6. Preferably the crest 19 is extended inwardly to that of the crest 21 of the first full tooth 6. As a result of continuing the crests 19 inwardly the base of the slopes of the tooth 9 will be slightly wider apart than the standard tooth 6 as clearly indicated in Fig. 2. The effect of this is to not only remove the intermediate thread 8 with the tooth 9 but also to remove the slopes of the thread 7 so that the succeeding tooth or teeth make no cut or very little cut on the outer slopes next the crests of the thread being cut. Thus the cuts made by the teeth 10, 11, 12, 13, 14, 15 and 16 have only the flat cross sectional chip, these teeth being relieved of slope cutting except to the depth of the flat chip. In this way the effort necessary to make the total cut is reduced.

What I claim as new is:—

1. The method of forming screw threads which consists in forming an initial thread of the desired pitch and with a crest approximately the final pointed crest and a single intermediate pointed thread of the same pitch cutting off the intermediate thread and then completing the trough by flat cuts.

2. The method of forming screw threads which consists in forming an initial thread of the desired lead and with a crest approximately the final crest and an intermediate thread of the same pitch cutting off the intermediate thread and then completing the trough by successive substantially flat cuts extending across the trough and following the thread slope at the sides of the trough.

3. The method of forming screw threads which consists in forming an initial thread of the desired lead and with crests approximating the final crests and an intermediate thread of the same pitch, cutting off the intermediate thread at its base and completing the trough.

4. The method of forming screw threads which consists in forming an initial thread of the desired lead and with crests approximating the final crests and an intermediate thread of the same pitch, cutting off the intermediate thread at its base and completing the trough by substantially flat cuts extending across the trough and following the slope of the thread at the sides of the trough.

5. The method of forming screw threads which consists in forming an initial thread of the desired lead and with crests approximating the final crests and an intermediate thread of the same pitch, cutting off the intermediate thread and the slopes leading to the intermediate thread, and completing the trough from which the intermediate thread is removed by substantially flat cuts extending across the trough.

6. A screw thread cutting tool having teeth cutting an initial thread on a taper with a final crest approximating the crest of the final thread said teeth forming an intermediate thread, a succeeding tooth cutting off said intermediate thread, said cutting-off tooth having guiding surfaces engaging the opposing slopes of the initial thread, and a succeeding tooth completing the trough.

7. A screw thread cutting tool having initial thread cutting teeth forming initial threads with crests approximating the crests of the final thread and an intermediate thread, said tool having successive teeth cutting off the intermediate thread and teeth completing the trough comprising successive teeth making substantially flat cuts across the trough.

8. A screw thread cutting die having initial thread cutting teeth forming an initial thread with a crest following the crest of the final thread and an intermediate thread, a succeeding cutting tooth cutting the intermediate thread at its base, and a succeeding tooth cutting below the base of the intermediate thread to complete the trough.

9. A screw thread cutting die having initial thread cutting teeth forming a throat and cutting initial threads with a crest of the lead and approximating the final crests and an intermediate thread, a succeeding tooth cutting off the intermediate thread, and a succeeding tooth cutting in the trough below the cut made by the cutting off tooth.

10. A screw thread cutting die having teeth cutting an initial thread on a taper with a final crest approximating the crest of the final thread, said teeth forming an intermediate thread, a succeeding tooth cutting off said intermediate thread, said cutting-off tooth having guiding surfaces contacting the opposing slopes of the initial thread, and a succeeding tooth completing the trough.

11. A screw thread cutting die having initial thread cutting teeth forming an initial thread on a taper with a crest following the crest of the final thread and an intermediate thread, a succeeding cutting tooth cutting the intermediate thread at its base, and a succeeding tooth cutting below the base of the intermediate thread to complete the trough.

12. A screw thread cutting die having a tooth cutting an initial thread on a taper with a final crest approximating the crest of the final thread, said tooth also forming an intermediate thread, a succeeding tooth cutting off said intermediate thread and the slopes leading to the intermediate thread, and succeeding teeth completing the trough from which the intermediate thread is removed.

13. A screw thread cutting die having a tooth cutting an initial thread on a taper with a final crest approximating the crest of the final thread, said tooth also forming an intermediate thread, a succeeding tooth cutting off said intermediate thread and the slopes leading to the intermediate thread, and succeeding teeth completing the trough from which the intermediate thread is removed comprising teeth making successive flat cuts in the trough.

In testimony whereof I have hereunto set my hand.

THORVALD PETERSEN.